United States Patent Office 3,192,182
Patented June 29, 1965

3,192,182
STABILIZATION OF POLYOXYMETHYLENE
Northrop Brown and William Earle Grigsby, Wilmington, Del., assignors to E. I. du Pont de Nemours and Company, Wilmington, Del., a corporation of Delaware
No Drawing. Filed Jan. 6, 1959, Ser. No. 785,136
13 Claims. (Cl. 260—67)

This invention relates to a process for preparing polyoxymethylene ethers, and, more particularly, it relates to the stabilization of polyoxymethylene having a number average molecular weight of at least 10,000 by reacting the polyoxymethylene with an orthoester, ketal, or orthocarbonate to obtain a polyoxymethylene ether having a number average molecular weight of at least 10,000 and a reaction rate constant for thermal degradation at 258° C. of less than approximately 15% by weight per minute.

In copending application Serial No. 682,325, filed by N. Brown et al. on September 6, 1957, there are described new high molecular weight polyoxymethylene ethers and a process for the preparation of these polymers using methylal as the etherifying reagent. These polymers have good thermal stability and resistance to basic media. Relatively large amounts of strong acid catalysts are required when methylal is used as the etherifying reagent and since the polyoxymethylene may be degraded by such acids at the temperatures necessary to effect stabilization, it is believed that this process is not the optimum one for the stabilization of polyoxymethylene. Prior to the invention of this copending application only low molecular weight unstable polyoxymethylene ethers of no commercial value were known to the art. These early polymers were prepared by H. Staudinger and his coworkers and reported by J. F. Walker in his monograph "Formaldehyde," second edition, Reinhold Publishing Corporation, New York (1953).

It has now been found that high molecular weight polyoxymethylene ethers may be made by reacting a high molecular weight polyoxymethylene with orthoesters, ketals or orthocarbonates, preferably trimethyl orthoformate, and preferably in a mildly acidic medium at moderate temperatures. The orthoesters, ketals and orthocarbonates have the general formula:

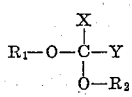

where $R_1$ and $R_2$ are alkyl groups of 1–4 carbon atoms and Y is selected from the class consisting of hydrogen, alkyl groups of 1–4 carbon atoms, and alkoxy groups of 1–4 carbon atoms and X is an alkoxy group of 1–4 carbon atoms when Y is hydrogen, and X is selected from the class consisting of alkyl groups of 1–4 carbon atoms and alkoxy groups of 1–4 carbon atoms when Y is selected from the class consisting of alkyl groups of 1–4 carbon atoms and alkoxy groups of 1–4 carbon atoms. The alkyl and alkoxy groups need not have the same number of carbon atoms. The reaction product is a polyoxymethylene ether, in some cases having substantially the same high molecular weight as the starting material, or in other cases up to 3 times the molecular weight of the starting material, and exhibiting an excellent thermal stability as evidenced by a reaction rate constant for thermal degradation at 258° C. of less than 15% by weight per minute, and usually less than 5% by weight per minute.

It is an object of this invention to provide a new and improved process for the preparation of high molecular weight, thermally stable polyoxymethylene ethers. It is another object of this invention to provide a process for the preparation of polyoxymethylene ethers having a number average molecular weight of up to 3 times the molecular weight of the starting material and which exhibit a reaction rate constant for thermal degradation at 258° C. of less than 15% by weight per minute, and, usually, of less than 5% by weight per minute.

The above objects are accomplished by providing a process which comprises reacting 1 part by weight of a polyoxymethylene starting material having a hydroxyl group for at least one of the two terminal portions of the polymer chain and having a number average molecular weight of at least 10,000 with 0.25 to 1000 parts by weight of a compound having the above-mentioned formula in the presence of 0.0025–5.0% by weight of the reaction medium exclusive of the polymer of a mineral acid, or a compound which gives an acidic reaction, such as boron trifluoride, and recovering a polyoxymethylene ether having a number average molecular weight of at least 10,000, and in some cases of 1–3 times the molecular weight of the starting material.

The term "polyoxymethylene ether" as used herein refers to a polymer of formaldehyde having recurring acetal linkages formed by alternate carbon atoms and oxygen atoms in the polymer chain and having an ether group of 1–4 carbon atoms as at least one of the end-groups which terminate the polymer chain. The terms "etherifying reagent" and "stabilizing reactant" are used interchangeably herein to designate the reagents which react with the hydroxyl end-groups of the polyoxymethylene. The terms "stabilized polymer" and "etherified polymer" are also used interchangeably to designate polyoxymethylene in which substantially all of the hydroxyl groups have been converted to ether groups. In the description of this invention, the property of thermal stability is defined by the value of the reaction rate constant for thermal degradation at 258° C. The decomposition of polyoxymethylene ethers follows, or closely approximates, a first-order reaction, which, in turn, may be expressed in terms of a differential equation:

$$\frac{-dw}{dt} = kw$$

in which $t$ is the elapsed time since the beginning of the decomposition reaction, $w$ is the weight of the material which remains undecomposed at time $t$, and $k$ is the rate constant for the equation. The value of $k$ in this equation is utilized in the description of this invention as the reaction rate constant for thermal degradation. In previous inventions, i.e. in copending application Serial No. 682,325 filed by Brown et al. on September 6, 1957, the reaction rate constant for thermal degradation was measured at 222° C.; however, the products of this invention were too stable to give meaningful and precise results when degraded at 222° C. and it was necessary to increase the temperature at which the thermal degradation was measured. As an approximation, a polymer having a $k_{222}=1\%$ would have a $k_{258}$ of about 15%. Most polymers which exhibit a $k_{222}$ of less than 1% by weight per minute are considered satisfactory for practically all applications. In view of the relationship mentioned above between the thermal stability measurements at 258° C. and 222° C., polymers which exhibit a thermal stability measured at 258° C. of less than 15% by weight per minute are also satisfactory for practically all molding applications and are within the purview of the products of the process of this invention. The reaction rate constant for thermal degradation as reported herein was determined by placing about 0.30 gram of the polymer in a dry, weighed vial. The vial was made from 19 mm. glass tubing 50 mm. in length, which was flattened at the bottom and provided with two holes near the top through which copper wire handles were inserted to permit manipulation without touching the glass. The vial was subsequently placed in a larger container which was equipped with a vacuum line and nitrogen gas line. Three cycles were applied to the container that held the vial, each cycle comprising applying vacuum, then purging the container with nitrogen gas. Following these cycles, vacuum was applied to the container for 15 minutes while nitrogen gas was bled into the container. The vacuum was then released and the nitrogen bleed was continued through the vial and the vial was then subjected to a temperature of 258° C. by immersing the container in a bath of diphenyl ether vapors (boiling point 258±1° C.) for 2 hours. The vial was then cooled to room temperature under a nitrogen blanket by cooling the container, and then weighed and returned to the container, whence two heating cycles of 4 hours duration with cooling and weighing after each cycle were made. The weights of the remaining solid polymer were recorded at intervals of 2 hours, 6 hours, and 10 hours, and were plotted as the logarithm of the weight or weight percent of undegraded polymer versus the corresponding time since the beginning of degradation. These plotted values normally define a line which is essentially straight throughout the major portion of the degradation period. The value of the reaction rate constant for thermal degradation, $k$, is 2.303 times the slope of the plotted line, and is calculated from the straight line portion of the curve. The units of $k$ are reciprocal minutes if the time, $t$, is in minutes, and therefore a $k$ of 0.01 reciprocal minute is equivalent to 1% per minute and represents a polymer degradation in which 1% of the polymer weight is being degraded per minute of reaction.

Number average molecular weight may be measured by the classical methods of osmometry, although this method is cumbersome and not particularly suitable for the lower range of molecular weights. A more convenient method, used in the examples of this description, involves an analysis for methoxyl groups found on the polymer. By assuming two methoxyl groups per polymer molecule (which is known to be generally true because of the results of other types of analysis), it is an easy mathematical calculation to translate weight percent of methoxyl into the number of methoxyl groups per 1000 formaldehyde units, and thence into a molecular weight of the polymer. The methoxyl analysis employed herein is the Zeisel method reported in "Official Methods of Analysis of the Association of Official Agricultural Chemists," 7th ed., A.O.A.C., Washington, D.C. (1950), pp. 744–745. Another convenient method for molecular weight determination is the measurement of the inherent viscosity of the polymer. Since this measurement of inherent viscosity bears a direct relationship to the number average molecular weight by methoxyl analysis for each class of polyoxymethylenes, both measurements are used herein to characterize the polymers.

Number average molecular weights of polyoxymethylenes having one or both of its terminal valences satisfied by hydroxyl groups, such as the polyoxymethylenes which are employed as the starting materials of the present process, are conveniently measured by infrared analysis techniques. The procedure employed in the infrared analysis is to press some of the polyoxymethylene to be analyzed into a film which is translucent and crack-free and is about 5 mils in thickness. The polyoxymethylene may be transformed into a film in the following examples by employing 20,000–40,000 p.s.i. of pressure and room temperature for approximately 30 seconds, although other equivalent conditions of pressure and temperature may be used. The film is then scanned by a Perkin-Elmer Model 21 Spectrophotometer, or its equivalent, equipped with calcium fluoride optics. The absorbance is measured at 2.9 microns and at 2.54 microns, the former being a measure of hydroxyl content of the polymer, and the latter being a measure of the amount of oxymethylene chain in the polymer. The base line for the 2.9 micron band is a line joining the minimum absorbance at 2.7 microns with the minimum absorbance at 3.0 microns. The base line for the 2.54 micron band is a line joining the minimum absorbance at 2.1 microns with the minimum absorbance at 2.7 microns. The number average molecular weight may be calculated from these infrared measurements and from a knowledge of whether the polyoxymethylene being tested has 1 or 2 hydroxyls per molecule. If the polyoxymethylene was made in a reaction medium consisting principally of a monohydric alcohol, the polyoxymethylene product will have one hydroxyl per molecule and one alkoxyl (corresponding to the alcohol) per molecule. If the polyoxymethylene was made in a reaction medium consisting principally of water or a dihydric alcohol or a hydrocarbon having water as an impurity, there will be two hydroxyls per molecule. The equation for calculating the number average molecular weight from the infrared measurements is:

$$M_n = \frac{X(7850)}{\frac{\text{absorbance at 2.9 microns}}{\text{absorbance at 2.54 microns}}}$$

where $M_n$ is the number average molecular weight and $X$ is the number of hydroxyls per polymer molecule. The inherent viscosity of the polymers (I.V.) of this invention is measured by dissolving 0.125 gram of the polymer in 25 ml. of reagent grade phenol which has been purified by distillation from solid caustic. The polymer is not soluble in the phenol at room temperature and usually the mixture is heated to 120° C. to increase the rate of solution of the polymer. The viscosity of the phenol solvent and the viscosity of the phenol polymer solution is measured at 90° C. by noting the time required to pass the same volume of each material through an Ostwald viscometer. The inherent viscosity (I.V.) is then determined by using the following formula:

$$I.V. = \frac{2.303}{\text{weight of polymer in solution}} \times \log_{10} \frac{\text{time of solution}}{\text{time of solvent}}$$

This inherent viscosity shows close correlation with the number average molecular weight of the polymer in each particular polymerization system in which the correlation is made.

The following examples serve to illustrate certain embodiments of this invention. Parts and percentages are based on weight unless otherwise specified. Measurements of molecular weight and of the reaction rate constant are made in the manner described hereinbefore. Measurements of pH were made in methanol with a neutral point of 8.0.

*Example 1*

The starting material for this example was a high molecular weight, linear polymer of formaldehyde which was prepared according to the general process of claim 8 of U.S. Patent 2,768,994 using dry cyclohexane as the reaction medium with a quaternary ammonium salt as the formaldehyde polymerization initiator. This polyoxymethylene had an average molecular weight of approximately 43,000 as determined by an analysis of hydroxyl end-groups per 1000 HCHO groups. A solution was prepared by combining 1 part by weight of triethyl orthoacetate and 3 parts by weight of phenol. The reagent grade triethyl orthoacetate was purified before use by allowing the orthoester to stand at room temperature in contact with metallic sodium for approximately four days, and then by double distilling the orthoester from anhydrous sodium carbonate. The reagent grade phenol was purified by distillation from solid caustic. Approximately 97.5 parts by weight of the above-described solution were added to a flask which was equipped with a paddle agitator. All glassware had been baked at 110° C. prior to use. Approximately 2.5 parts of the above-described polymer which had been dried for 30 minutes in a vacuum oven at 70° C. was added to the solution in the flask. The atmosphere above the solution was filled with dry nitrogen gas and the agitator was started. The contents of the flask were rapidly heated to 134° C., whence the polymer dissolved, and held at this temperature for approximately 0.5 hour. The contents of the flask were then cooled slowly to room temperature and the polymer was separated from the solution by filtration. The polymer was then washed once with dioxane, three times with methanol, twice with acetone, and finally was allowed to dry at room temperature. The polymer which was recovered amounted to 96.3% of the original 2.5 parts. This polymer was designated as crude, stabilized or etherified polymer and had a reaction rate constant for thermal degradation of 0.18%/min.

In order to remove any unreacted polymer or impurities, 1 part of the crude, stabilized polymer, 105 parts of redistilled benzyl alcohol, and 0.53 part of tripropylamine were added to a pressure bottle which was equipped with stainless steel inlet and exit nitrogen line, a thermocouple well and a magnetic stirring mechanism. The bottle was placed in a silicone oil bath, purged thoroughly with nitrogen, and finally pressurized with nitrogen to 10 p.s.i.g. The bath was heated rapidly, while the mixture in the bottle was stirred, and after 15 minutes the temperature of the mixture was about 145° C. and the polymeric particles were completely dissolved. The temperature was increased to 165° C. and held between 160° C. and 165° C. for 25 minutes, then cooled by cooling the bath with a water-cooled coil. When the bath temperature reached 100° C. (mixture temperature approximately 130° C.), the water flow through the coil was stopped to permit slow precipitation of the polymeric particles. This precipitation occurred at a mixture temperature of about 105° C. Subsequently, the mixture was cooled to room temperature, filtered, washed six times with acetone and dried at room temperature. There was recovered 0.98 part of refined, stabilized or etherified polymer which represented 98.0% recovery over this purification step, or 94.5% recovery based on the original starting material. The refined polymer was found to have a reaction rate constant for thermal degradation at 258° C. ($k_{258}$) of 0.16% by weight per minute.

*Example II*

The starting material and purification steps for this example were similar to that of Example I with the exception that the temperature of the contents of the flask was slowly raised from 50° C. to 120° C. and the slurry held at the latter temperature for approximately 2.5 hours, then cooled and worked up as in Example I. The recovery of crude, etherified polymer was 86.5% and the recovery of refined, etherified polymer was 88% or 76% of the crude, unstabilized or unetherified polymer as charged to the reactor. A portion of this refined polymer was hot-pressed at 190–200° C. and about 30,000 p.s.i. to produce a film approximately 3 mils thick, and, after aging the film in air at 105° C. for 7 days, the film could be folded and creased along a line, and folded and creased in the reverse direction along the same line without breaking the film. The film, therefore, had a degree of toughness of at least 1, as described in U.S. Patent 2,768,994, issued October 30, 1956, to R. N. MacDonald.

*Example III*

In this example, the starting material was an essentially 100% crystalline polyoxymethylene having the polymer chains terminated at each end by hydroxyl groups and having a molecular weight of 17,000 as determined by measurement of the number of hydroxyl groups per 1000 formaldehyde molecules. This polymer was quite unstable to heat.

A solution was prepared by combining 1 part by weight of trimethyl orthoacetate and 3 parts by weight of phenol. The reagent grade triethyl orthoacetate was purified before use by allowing the orthoester to stand at room temperature in contact with metallic sodium for approximately 4 days and then by double distilling the orthoester from anhydrous sodium carbonate. The reagent grade phenol was purified by distillation from solid caustic. All glassware was baked at 110° C. prior to use. Approximately 97.5 parts by weight of the above-described solution was placed in a flask which was equipped with a paddle agitator, following which 2.5 parts of the above-described polymer, which had been dried for 30 minutes in a vacuum oven at 70° C., was added to the solution in the flask. The atmosphere above the solution was filled with dry nitrogen gas and the agitator was started. The temperature of the contents of the flask was held at 60° C. in a constant temperature bath for approximately 24 hours. The slurry was then cooled to room temperature and the polymer was recovered by filtration, washed, and dried as in Example I. The recovered, crude, stabilized polymer amounted to 2.42 parts, or 96.9% of the original 2.5 parts. The polymer was refined as in Example I with the exception that the solution was held between 160° and 165° C. for 5 minutes instead of 25 minutes, and 0.498 part of refined, stabilized polymer was recovered, representing a recovery of 49.8% over the refining step or 48.2% recovery based on the 2.5 parts of polymer that constituted the original charge.

This refined polymer was found to have a reaction rate constant for thermal degradation at 258° C. ($k_{258}$) of 0.265% by weight per minute. The number average molecular weight of this polymer was 35,000 as determined by methoxyl analysis. The average molecular weight of this refined, stabilized polymer of 35,000 represented an increase of approximately 18,000 over the initial unstabilized polymer. The mechanism by which the trimethyl orthoacetate coupled the polymer chains is not known with certainty; however, it is believed that the chains of the polymer of this example as opposed to the chains of the polymer that were used in Example I are highly oriented, with their hydroxyl end-groups easily available for reaction, and, as such, the chains lend themselves more readily to coupling by the orthoester.

*Example IV*

Into a flask there was placed 95 parts of trimethyl orthoacetate containing 1.94 parts of sulfuric acid. The contents of the flask were heated to 60° C. in an oil bath and, after this mixture had been held at 60° C. for 10 minutes the pH was 7.5 and 5 parts of the same unstabilized polymer which was used in Example III was added to the solution. The resultant slurry was maintained for 24 hours at 60° C., then cooled to room temperature and filtered. The polymer particles were washed and dried as in Example I and 4.98 parts of crude, stabilized polymer, or 99.6% of the original 5 parts, were recovered. When this crude, stabilized polymer was refined as in Example III, 73% of the crude polymer was recovered as refined, stabilized polymer. The reaction rate constant for thermal degradation at 258° C. was estimated to be less than 0.5% by weight per minute. The number average molecular weight of this refined, stabilized polymer as determined by analysis of methoxy groups was 37,000, or roughly 2.2 times the molecular weight of the initial unstabilized polymer.

A portion of the crude, stabilized polymer of this example was tested for its stability in a strongly caustic medium in the following manner. A pressure bottle, as described in Example I, was charged with:

3.1 grams of potassium hydroxide
2.0 grams of sodium hydroxide
0.6 ml. of water

This mixture was fused by heating it under nitrogen at atmospheric pressure and 200° C. for about 15 minutes. The bottle and contents were then cooled, and 0.6 gram of the above-mentioned crude, stabilized polymer and 50 ml. of trioxymethylene dimethyl ether (an inert, caustic-stable, solvent for the polymer) were added. The entire contents were agitated in the bottle and heated rapidly under 35 p.s.i. of nitrogen pressure. By the time the temperature had reached 168° C., the polymer was dissolved in the solvent. The temperature was maintained at 172° C. for 60 minutes. Two liquid phases were present: the caustic and the polymer dissolved in the solvent. The bottle and its contents were cooled to room temperature, causing the caustic to solidify and the polymer to precipitate. After the addition of 50 ml. of water, the bottle was reheated to 60° C. to dissolve the caustic. The contents of the bottle were filtered, washed once with dioxane, four times with a 1/1 water/methanol solution, three times with acetone, and dried. The recovery over this caustic-fusion step was 92.5%.

*Example V*

In this example the starting material was polyoxymethylene glycol (substantially 100% crystalline) similar to the starting material of Example III but which had a molecular weight of 16,000.

A mixture was prepared introducing 95 parts of prepurified trimethyl orthoacetate containing .04 part of boron trifluoride into a dry flask which was baked at 110° C. prior to use. After the mixture had stood at room temperature for 30 minutes, 5 parts of the above-described polymer which had been dried for 30 minutes in a vacuum oven at 70° C. was added to the mixture and the resultant slurry was held at about 25° C. for approximately 24.8 hours, when at the end of said period the polymer particles were recovered by filtration. The particles were washed and dried substantially as described in Example I, and 5.0 parts of crude, stabilized polymer, or 100% of the initial 5 parts, were recovered. Then this crude, stabilized or etherified polymer was refined as described in Example III, and 3.1 parts of refined, etherified polymer were recovered, which represented at 61.9% recovery over the refining step, or 61.9% over-all recovery. A measurement of the inherent viscosity showed that this refined, etherified polymer had a number average molecular weight of approximately 43,000, or 2.7 times the molecular weight of the starting material. The reaction rate constant for thermal degradation at 258° C. of this refined polymer was .08% by weight per minute.

*Example VI*

The starting material for this example was a substantially 100% crystalline polyoxymethylene having a molecular weight of approximately 26,000 as measured by methoxyl analysis, and having the polymer chain terminated at one end by a hydroxyl group and at the other end by an alkyl group. Into a dry flask, which had been baked at 110° C. prior to use, there were added 97.5 parts of prepurified trimethyl orthoacetate, 2.5 parts of the above-described polymer, and 0.3 part of ethylpiperidine hydrochloride. The flask was sealed, placed in a 60° C. oil bath, and held at 60° C. for 24 hours. At the end of the 24-hour period, the polymeric particles were recovered by filtration. The product was washed and dried as described in Example I and 2.5 parts, or 100% of the original polymer charge, was recovered as crude, stabilized polymer. After refinement of 1 part of the crude, stabilized polymer as described in Example III, 0.575 part of refined polymer was recovered. The recovery of 0.575 part of refined polymer corresponds to a 52.4% yield over the refining step, or 52.4% of the orginal charge. The molecular weight of the refined polymer was approximately 39,000 or 1.5 times the molecular weight of the starting material.

*Example VII*

The starting material for this example was prepared by a process similar to that used for the preparation of the unstabilized polymer of Example I and had a molecular weight of approximately 37,000. Into a dry, stainless steel, cylindrical pressure vessel (shaker tube) of approximately 330 cc. in volume were placed 28.8 grams of the above-described polymer and 1 ml. of purified trimethyl orthoformate. The contents of the vessel were then pressurized to 1 atmosphere with dry nitrogen gas, the vessel was sealed, and the agitation was started by shaking the vessel. The vessel was heated to 200° C. and held at that temperature for 20 minutes whence the vessel was cooled to room temperature and 27.0 grams of crude, stabilized polymer were recovered according to the procedure described in Example I. After refining the crude, stabilized polymer, also as described in Example I, 36.2% of the crude polymer was recovered as refined, stabilized polymer which had a reaction rate constant for thermal degradation at 258° C. ($k_{258}$) of 0.39% by weight per minute. In this example, the stabilization was effected without the addition of a catalyst.

*Example VIII*

The unstabilized polymer which was used in this example was identical to that used in Example I. In this example, stabilization was effected by contacting a weighed amount of unstabilized polymer with a vapor stream which contained a stabilizing reactant and a catalyst. A glass vessel, which had a porous, fritted bottom, a vapor inlet below the frit and a vapor outlet above the frit, was used as the reactor. The frit retained the polymer and acted as a distributor for the vapor stream which was passed upflow through the frit. The temperature was controlled by immersing the reactor in a controlled temperature oil bath. Approximately 2 grams of unstabilized polymer was charged to the reactor and 4 ml. of purified trimethyl orthoacetate which contained approximately 360 parts per million of a boron trifluoride catalyst was added dropwise to prewet the polymer. The reactor was purged with nitrogen for 45 minutes, then immersed in an oil bath at 170° C., where a vapor stream of the above orthoester and catalyst (corresponding to 30 ml. liquid) was passed through the reactor over a 20 minute period. A vapor stream of the orthoester (corresponding to 7 ml. liquid) was then fed through the bed over a 5 minute period. This vapor was followed by a nitrogen purge for 5 minutes at 170° C., and the bath was cooled to room temperature with the nitrogen purge continuing through the reactor. The product was then removed from the reactor, washed four times with acetone, and air-dried to obtain the weight of the crude, stabilized polymer. Substantially 100% of the original charge was recovered as crude, stabilized polymer, which had a reaction rate constant for thermal degradation at 258° C. ($k_{258}$) of 0.055% by weight per minute and substantially the same molecular weight as the starting material. When this crude, stabilized polymer was refined as described in Example I, 98.6% was recovered as refined, stabilized polymer. The stability of the above crude, stabilized polymer should permit this polymer to be used without refining for most molding applications.

*Example IX*

The stabilization process of Example VIII was repeated using 190 parts per million of boron trifluoride catalyst. Of the original charge, 99.6% was recovered as crude, stabilized polymer, which was subsequently refined with a yield of 97.0%. The crude, stabilized polymer had a reaction rate constant for thermal degradation ($k_{258}$) of 0.05% at 258° C. and substantially the same molecular weight as the starting material. The crude, stabilized polymer of this example could probably be used without further refining in most molding applications.

*Example X*

The unstabilized polymer for this example was similar to that used in Example VI with the exception that this material had a molecular weight of 24,600. This polymer was stabilized as in Example VIII using trimethyl orthoacetate containing 250 parts per million of boron trifluoride. Of the original charge, 99% was recovered as crude, stabilized polymer which was subsequently refined with a yield of 91.1%. The reaction rate constant at 258° C. ($k_{258}$) for the stabilized product was 0.036% per minute. The molecular weight of the stabilized polymer was found to be 32,000 by methoxyl analysis, which represented approximately 1.4 times the molecular weight of the unstabilized polymer.

*Example XI*

The vapor phase stabilization was repeated as in Example VIII, but in this example 2,2-dimethoxypropane containing 1340 parts per million of boron trifluoride was used as the stabilizing reactant. Of the original charge 97.4% was recovered as crude, stabilized polymer and 35.0% of the crude, stabilized polymer was recovered after refining. The reaction rate constant for thermal degradation at 258° C. was 0.09% by weight per minute. Other experiments indicated that the stabilizing reactant used in this example might also be used in a process similar to that of Example IV, in place of the trimethyl orthoacetate of that example.

*Example XII*

The starting material for this example was prepared by the same process used for the preparation of the unstabilized polymer in Example I, and had a molecular weight of approximately 40,000. To a reactor of the same design that was used in Example VIII, was charged 2.0 grams of the above-described polymer which had been dried for 30 minutes in a vacuum oven at 70° C. The reactor was purged with dry nitrogen gas at approximately 500 cc. per minute and after 10 minutes a vapor stream of boron trifluoride (0.16 cc. gas/minute) was started through the bed of the reactor with the nitrogen. The reactor was then immersed in an oil bath at 170° C. and a vapor stream of tetramethylorthocarbonate (corresponding to 0.5 ml. of liquid per minute) was fed to the reactor for 10 minutes and was caused to mix with the catalyst and nitrogen immediately before the gases entered the bed of the reactor. After the 10 minute period the catalyst flow was stopped and the orthocarbonate vapor was continued for an additional three minutes to remove any residual catalyst from the polymer whence the reactor was removed from the oil bath and the flow of orthocarbonate was stopped. After the reactor had cooled for approximately 10 minutes, the nitrogen flow was stopped and the polymer was removed from the reactor, rinsed and dried as shown in Example I. Of the original charge 94.4% was recovered as crude, stabilized polymer and upon refining this polymer as shown in Example I, 50.4% of the crude, stabilized polymer was recovered as refined, stabilized polymer which had substantially the same molecular weight as the starting material and a reaction rate constant for thermal degradation of 0.03% by weight per minute.

*Example XIII*

In this example, several runs were made to obtain sufficient stabilized or etherified polymer for the evaluation of additional physical properties of the polyoxymethylene ethers. Three runs were made according to the following typical procedure: Approximately 800 grams of unstabilized polymer similar to that used as a starting material in Example I, which had a molecular weight as measured by inherent viscosity of approximately 40,000, was charged to a stainless steel, steam jacketed pipe, three inches in diameter which was mounted vertically and which was equipped with a gas distributor plate in the lower portion of the pipe, a vapor inlet below the plate and a vapor exit above the plate. After purging the reactor with nitrogen gas, a gaseous mixture consisting of 75% nitrogen, 25% trimethyl orthoformate and 0.04% boron trifluoride was fed upflow through the distributor plate at 25 liters per minute and at a temperature of 160° C. The gas flow maintained the polymer in a fluidized state. Simultaneously, steam was applied to the reactor jacket and held at 75 lbs./in.² After 10 minutes the polymer reached 150° C. and was maintained at that temperature for an additional 20 minutes whence the boron trifluoride flow was stopped and the nitrogen-trimethyl orthoformate mixture was continued for a 10 minute period. The gas flow was stopped and 792 grams of crude, stabilized polymer was recovered which had a reaction rate constant for thermal degradation ($k_{258}$) 0.073% by weight per minute and substantially the same molecular weight as the starting material. A small portion of this polymer was refined as in Example I and 96.8% of the portion was recovered as refined, stabilized polymer. Approximately four pounds of crude, stabilized polymer produced by the above procedure was blended with 0.008 pound of 4,4'-butylidene bis-(3-methyl-6-tertiary butyl phenol) and 0.02 pound of a polyamide (terpolymer of approximately 38% polycaprolactam/35% polyhexamethylene adipamide/27% polyhexamethylene sebacamide). This blend was extruded in a one-inch laboratory screw-type extruder at 190° C. into a rod ⅛ of an inch in diameter which was subsequently quenched in a water bath and cut into small cubes. These cubes were then injection molded in a one-ounce Watson-Stillman machine into test bars 5" x ½" x ⅛" in dimension. The cylinder temperature in the injection machine was 200° C. at the top and 210° C. at the bottom. The properties of the test bars are given below:

| Property: | A.S.T.M. analytical method |
|---|---|
| Tensile strength, 9,920±80 p.s.i. | D-638 |
| Ultimate elongation, 14±1% | D-638 |
| Flexural modulus, 428,000±7,000 p.s.i. | D-790 |

The above example shows that the polyoxymethylene ethers of this invention may be molded into useful articles by conventional techniques.

The polyoxymethylene employed as a starting material in the process of this invention is a polymer of formaldehyde having recurring acetal linkages formed by alternate carbon atoms and oxygen atoms in the polymer chain. Thus, polyoxymethylene has the general formula:

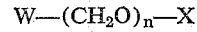

wherein W and X are atoms or radicals forming endgroups which terminate the polymer chain. For example, if W is hydroxyl and X is hydrogen, the polymer is called polyoxymethylene glycol. The process of this invention changes a hydroxyl group, such as W above, into an ether group containing 1–4 carbon atoms and yields a polymer hereinbefore designated as a polyoxymethylene ether.

The orthoester which is one of the stabilizing reactants of the process of this invention has the general formula:

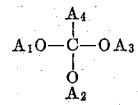

where $A_1$, $A_2$, and $A_3$, are alkyl groups of 1–4 carbon atoms and $A_4$ may be an alkyl group of 1–4 carbon atoms or hydrogen. Specific examples of the orthoesters which are operable in the process of this invention are trimethyl orthoformate, trimethyl orthoacetate, tributyl orthopropionate, tripentyl orthobutyrate, trihexyl orthohexoate, tributyl orthoformate, tripropyl orthoacetate, triethyl orthoformate, and triethyl orthoacetate, and the like.

The ketal which is one of the stabilizing reactants of the process of this invention has the general formula:

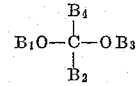

where $B_1$ and $B_3$ are alkyl groups of 1–4 carbon atoms and $B_2$ and $B_4$ are alkyl groups of 1–4 carbon atoms. Specific examples of the ketals which are operable in the process of this invention are 3,3-diethoxypentane, 3-ethoxy-3-methoxypentane, 3,3-dimethoxyheptane, 3,3-dimethoxypentane, and 2,2-isobutoxypropane.

The orthocarbonate which is one of the stabilizing reactants of the process of this invention has the general formula:

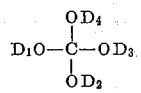

where $D_1$, $D_2$, $D_3$ and $D_4$ are alkyl groups of 1–4 carbon atoms. Specific examples of the orthocarbonates which are operable in the process of this invention are tetrapropyl orthocarbonate and tetrabutyl orthocarbonate. The preferred compounds of the above-mentioned orthoesters, ketals and orthocarbonates are those compounds whose alkoxy groups have 1 or 2 carbon atoms and whose alkyl groups have 1 carbon atom.

The amount of orthoester, ketal or orthocarbonate which is employed may vary over a rather wide range. It is, of course, theoretically necessary to supply only enough of the above stabilizing reactants to convert hydroxyl groups on the ends of the polymer chain to alkoxy groups, and to couple any chains that are available for coupling. Some unstabilized polymers may be polyoxymethylene glycols in that a hydroxyl is present on each end of the chain, while other molecules may have only one end of the chain terminated with a hydroxyl and the other end of the chain terminated with an alkyl group, an ester group, or the like. It is believed that in the case where the end groups are coupled by the orthoester, only one molecule of orthoester is needed to react with two end groups. Although it is definitely established by the foregoing examples that the coupling of polymer chains is accomplished by use of these stabilizing reactants or etherifying reagent, the mechanism by which this coupling occurs is not definitely established, and for this reason the theoretical requirements of said agents are speculative. When a Bronsted acid, such as sulfuric acid or hydrochloric acid, is used, some reactions of the acid with the stabilizing agent compete with the reaction of the stabilizing reactant and the unstabilized polymer. If necessary, the amount of both the catalyst and the stabilizing reactant should be increased over the theoretical amounts to insure a rapid and complete reaction of the stabilizing reactant with the unstabilized polymer. The amount of acid catalyst which is employed in the stabilization reaction will also depend upon the solubility of the catalyst in the reaction medium in a slurry or solution process or upon the volatility of the catalyst in a vapor phase process. When commercially acceptable yields are required, the stabilization should be carried out in the presence of an acid catalyst i.e., in a mildly acidic reaction medium. The term "mildly acidic reaction medium" is construed to mean any medium which, because of the presence therein of an acid or an acid producing compound, is capable of donating protons or accepting electrons. Some examples of the acids or acid reacting compounds that may be used as catalysts within the scope of this invention include Lewis acids usually of the Friedel-Crafts type such as boron trifluoride, aluminum trichloride, tin tetrachloride and titanium tetrachloride; protonic or Bronsted acids with a pK of less than 5.5, including organic carboxylic acids such as adipic acid, formic acid and glutaric acid, sulfonic acids such as paratoluene sulfonic, inorganic acids such as sulfuric, hydrochloric and phosphoric acids and the like; and phenols, pK greater than 5.5. The salts of strong acids (pK less than 2.0) with weak bases may also be used. The acid catalyst should be compatible with the etherifying reagent i.e., should not form insoluble complexes with the reagent in the case of the slurry or solution process and should not form non-volatile complexes in the case of the vapor phase process. Strong acids and acids which are strong oxidizing or reducing agents should be used sparingly to prevent excessive degradation of the unreacted polymer by causing the reaction medium to be more than mildly acidic. Excessive degradation may also be avoided by adding these acids in such a manner that the contact time of the acid with the unreacted polymer is held at a minimum. The preferred range of concentration of acid catalysts, excluding phenol and the Lewis acids, is from 0.01–5% by weight of the reaction medium excluding the polymer therein. The same range is preferred for their salts with weak bases. The preferred range of concentration of phenol is from 5%–90% by weight of the reaction medium exclusive of the polymer therein. The preferred range of concentration of the Lewis acids is 0.001%–0.5% by weight of the reaction medium exclusive of the polymer and the preferred catalyst for the process of this invention which lies within this group of Lewis acids is boron trifluoride.

The reaction conditions for accomplishing the stabilization of polyoxymethylene using the above-mentioned etherifying reagents are not restrictive, but, on the contrary, a wide variety of conditions may be used in the different embodiments of this process. For instance, the examples illustrate the fact that the stabilization of polyoxymethylene with etherifying or stabilizing reactants can be accomplished in any compatible medium in which the polymer can be intimately contacted with the desired stabilizing reactant. The medium may be a non-degrading solvent for polyoxymethylene, or it may be a non-solvent which forms a slurry with polyoxymethylene particles, or the stabilizing reactant and catalyst may be in the vapor phase while polyoxymethylene is present as a solid. Inert gases such as nitrogen and carbon dioxide, which are relatively pure, may be added as diluents to the vapor in the case where the stabilizing reactant and the catalyst are in the vapor phase while the polyoxymethylene present as a solid during the reaction. Solvents for the polyoxymethylene in a solution process may be orthoesters, dimethylformamide, dixylenol butane, halogenated phenol, while non-solvents may include ethers, hydrocarbons, alkylene and alkyl halides, and like compounds which are familiar to skilled chemists. Some of the solvents for the polyoxymethylene, such as dimethylformamide, will also increase the solubility of the catalyst in the reaction medium and thus allow the use of catalysts which by themselves would not give a satisfactory reaction. The time of reaction may be as long as is necessary to reach completion of the reaction without decomposing too much unstabilized polymer, and with long reaction time temperatures as low as 0° C. may be employed. Temperatures as high as 200° C. may be employed with short reaction times. The temperature, time, concentration of the reactants, strength of the catalyst, and efficiency of the stabilization reactant must be balanced, as in most other reactions, so as to cause an acceptable amount of reaction in a reasonable time. The chains of the polymer are susceptible to attack by acids, and may be cleaved by such an attack. Therefore, when an acid catalyst is used, it is important to adjust the reaction temperature and time so that the cleavage which takes place is slow enough and yet the replacement of end-groups is fast enough that an acceptable yield is obtained. Additional considerations in the use of acid catalysts are given above. In the preferred embodiment of the process of this invention, the reaction temperature is between 120–175° C.; the polyoxymethylene is in the solid phase; the preferred stabilizing agent, trimethyl orthoformate, is present at a concentration of 0.1–10 parts per part of polyoxymethylene and in the vapor phase; and the preferred catalyst, boron trifluoride, is present at a concentration of 0.001 to 0.5% by weight of reaction medium exclusive of the polymer and in the vapor phase.

The crude, stabilized polymer may possess sufficient thermal stability to be molded without refining; however, in the preparation of molded objects which require extremely thermally stable polymer it may be desirable to remove substantially all of the unreacted polyoxymethylene. The unreacted polyoxymethylene may be removed by dissolving the unpurified product and heating the solution in the presence of a strong amine as in Example I or a caustic as illustrated in Example IV to depolymerize the unreacted polyoxymethylene. Solvents which may be used in the presence of an amine include the aliphatic and aromatic hydroxy compounds such as cylohexanol, glycol, benzyl alcohol and phenol, and the preferred solvents for the caustic treatment are the ethers, such as trioxymethylene dimethyl ether and diethylene glycol dimethyl ether. Amines and caustics which are useful in the purification step include triethylamine, tripropylamine, sodium hydroxide, and potassium hydroxide. A particularly desirable caustic is an equimolar mixture of sodium hydroxide and potassium hydroxide because it forms an eutectic at a convenient processing temperature. Another procedure which may be employed for the removal of unreacted polyoxymethylene is the thermal degradation of the solid or molten polymer, or of the polymer in solution, in the absence of an amine or a caustic.

The process of this invention is a particularly desirable one, not only because the end product is a desirable member of the polyoxymethylene family which exhibits exceptional thermal stability, but also in some cases because the etherifying reagent also causes coupling of the polymer chains. These ether-capped polymers may be pressed or extruded into films, spun into fibers, filaments, or bristle material, injection molded, or extrusion molded. The composition of this invention has a remarkably good thermal stability and an excellent resistance to caustic hydrolysis, as shown in Example IV. Polyoxymethylene dicarboxylates, as described and claimed in copending patent application Ser. No. 443,702, filed by Dal Nogare and Punderson on July 15, 1954, now abandoned, are completely destroyed by the caustic-fusion treatment of Example IV.

We claim:

1. A process for the preparation of a polyoxymethylene ether which comprises reacting at a temperature from 0° C. to 200° C. in a mildly acidic reaction medium substantially all hydroxyl groups in 1 part by weight of a polyoxymethylene starting material having a number average molecular weight of at least 10,000 and having a hydroxyl group for at least one of the two terminal portions of the polymer chain of said starting material with 0.25 to 1000 parts by weight of a compound having the general formula:

where $R_1$ and $R_2$ are alkyl groups of 1–4 carbon atoms and Y is selected from the class consisting of hydrogen, alkyl groups of 1–4 carbon atoms, and alkoxy groups of 1–4 carbon atoms and X is an alkoxy group of 1–4 carbon atoms when Y is hydrogen and X is selected from the class consisting of alkyl groups of 1–4 carbon atoms and alkoxy groups of 1–4 carbon atoms when Y is selected from the class consisting of alkyl groups of 1–4 carbon atoms and alkoxy groups of 1–4 carbon atoms, and recovering a polyoxymethylene ether having a number average molecular weight of at least 10,000 and having an ether group for at least one of the two terminal portions of the polymer chain of said polyoxymethylene ether.

2. The process of preparing a polyoxymethylene ether which comprises reacting at a temperature from 0° C. to 200° C. in a mildly acidic reaction medium 1 part by weight of a polyoxymethylene starting material having substantially of the two terminal valences satisfied with a hydroxyl group and having a number average molecular weight of at least 10,000 with 0.25 to 1000 parts by weight of a compound having the general formula:

where $R_1$ and $R_2$ are alkyl groups of 1–4 carbon atoms and Y is selected from the class consisting of hydrogen, alkyl groups of 1–4 carbon atoms, and alkoxy groups of 1–4 carbon atoms and X is an alkoxy group of 1–4 carbon atoms when Y is hydrogen and X is selected from the class consisting of alkyl groups of 1–4 carbon atoms and alkoxy groups of 1–4 carbon atoms when Y is selected from the class consisting of alkyl groups of 1–4 carbon atoms and alkoxy groups of 1–4 carbon atoms, and recovering a polyoxymethylene ether having an ether group derived from said compound of from 1–4 carbon atoms for both terminal portions of the polymer chain of said polyoxymethylene ether and having a number average molecular weight of at least 10,000 and a reaction rate constant for thermal degradation at 258° C. of less than 15% by weight per min.

3. The process of preparing a polyoxymethylene ether which comprises reacting at a temperature from 0° C. to 200° C. in an acidic reaction medium 1 part by weight of a polyoxymethylene starting material having one of the two terminal valences satisfied with a hydroxyl group and the other terminal valence satisfied with an alkyl group of 1–4 carbons, and having a molecular weight of at least 10,000 with 0.25 to 1000 parts by weight of an orthoester having the formula:

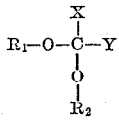

wherein $R_1$, $R_2$ and $R_3$ comprise alkyl groups of 1–4 carbon atoms and $R_4$ is selected from the class consisting of alkyl groups of 1–4 carbon atoms and hydrogen, and recovering a polyoxymethylene dialkyl ether having a number average molecular weight of at least 10,000.

4. The process of preparing polyoxymethylene methyl ether which comprises reacting 1 part by weight of a polyoxymethylene starting material having 1–2 of its terminal valences satisfied with a hydroxyl group and having a number average molecular weight of at least 10,000 with 0.1–1000 parts by weight of a trimethyl orthoester having the formula:

wherein R is an alkylidyne of 1–5 carbon atoms; said orthoester containing 0.00–5% by weight of boron trifluoride catalyst at a temperature of 15° to 175° C. and recovering polyoxymethylene methyl ether having a number average molecular weight of at least 10,000 and a reaction rate constant for thermal degradation at 258° C. of less than 15% by weight per minute.

5. The process of claim 4 wherein the trimethyl orthoester is trimethyl orthoformate.

6. The process of claim 4 wherein the trimethyl orthoester is trimethyl orthoacetate.

7. The process of claim 4 wherein the product, polyoxymethylene methyl ether, has a number average molecular weight of from 10,000 to 3 times the number average molecular weight of the starting polymer.

8. The process of claim 4 in which said polyoxymethylene starting material is in solution while being reacted with said trimethyl orthoester.

9. The process of claim 4 in which said polyoxymethylene is in the form of a finely divided powder dispersed in a liquid reaction medium comprising said trimethyl orthoester.

10. The process of claim 4 in which said trimethyl orthoester and said catalyst are in the vapor phase and said polyoxymethylene is in the solid phase.

11. The process of claim 4 in which the product, polyoxymethylene methyl ether, is purified by a subsequent step of precipitating the said product from solution in a solvent for said polyoxymethylene methyl ether.

12. A process for the preparation of polyoxymethylene ether which comprises reacting in a mildly acidic reaction medium 1 part by weight of polyoxymethylene starting material having 1–2 of its terminal valences satisfied with a hydroxyl group and having a number average molecular weight of at least 10,000 with 0.25 to 1000 parts by weight of a compound having the general formula:

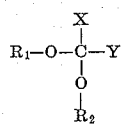

where $R_1$ and $R_2$ are alkyl groups of 1–4 carbon atoms and Y is selected from the class consisting of hydrogen, alkyl groups of 1–4 carbon atoms, and alkoxy groups of 1–4 carbon atoms and X is an alkoxy group 1–4 carbon atoms when Y is hydrogen and X is selected from the class consisting of alkyl groups of 1–4 carbon atoms and alkoxy groups of 1–4 carbon atoms when Y is selected from the class consisting of alkyl groups of 1–4 carbon atoms and alkoxy groups of 1–4 carbon atoms, at a temperature of from 0° C. to 200° C., and recovering a polyoxymethylene ether having a number average molecular weight of at least 10,000 and having an ether group for at least one of the two terminal portions of the polymer chain of said polyoxymethylene ether; said mildly acidic reaction medium comprising a catalyst selected from the class consisting of Friedel-Crafts metal halides, organic carboxylic acids having a pK of less than 5.5, sulfonic acids having a pK of less than 5.5, inorganic acids having a pK of less than 5.5, phenols having a pK of greater than 5.5, and salts of acids having a pK of less than 2.0 with weak bases; the concentration of said catalyst based on the weight of reaction medium exclusive of polymer being from 0.001%–0.5% in the case of said Friedel-Crafts metal halides, from 5%–90% in the case of phenols, and from 0.01%–5% in the case of all others of the aforementioned catalyst types.

13. A process for the preparation of a high molecular weight, thermally stable polyoxymethylene alkyl ether which comprises reacting in an acidic reaction medium a high molecular weight polyoxymethylene starting material having 1–2 of its terminal valences satisfied by a hydroxyl group with a compound having the general formula:

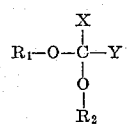

where $R_1$ and $R_2$ are alkyl groups of 1–4 carbon atoms and Y is selected from the class consisting of hydrogen, alkyl groups of 1–4 carbon atoms, and alkoxy groups of 1–4 carbon atoms and X is an alkoxy group of 1–4 carbon atoms when Y is hydrogen and X is slected from the class consisting of alkyl groups of 1–4 carbon atoms and alkoxy groups of 1–4 carbon atoms when Y is selected from the class consisting of alkyl groups of 1–4 carbon atoms and alkoxy groups of 1–4 carbon atoms, and recovering said polyoxymethylene alkyl ether having an ether group for at least one of the two terminal portions of the polymer chain of said polyoxymethylene alkyl ether.

References Cited by the Examiner
UNITED STATES PATENTS 2,512,950    6/50    Londergan _____ 260—67

OTHER REFERENCES

Hine: Physical Organic Chemistry, 1956, pp. 46 and 47.

WILLIAM H. SHORT, *Primary Examiner*.

H. N. BURSTEIN, P. MANGAN, MILTON STERMAN, *Examiners*.